United States Patent
Webster et al.

(10) Patent No.: US 8,590,657 B2
(45) Date of Patent: Nov. 26, 2013

(54) VEHICLE WHEEL ASSEMBLY HAVING A SELF-RETAINING BEARING

(75) Inventors: James A. Webster, Shelby Township, MI (US); Tomasz Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/315,999

(22) Filed: Dec. 9, 2011

(65) Prior Publication Data

US 2013/0146380 A1    Jun. 13, 2013

(51) Int. Cl.
    *B60K 17/30*    (2006.01)
(52) U.S. Cl.
    USPC ...... 180/253; 280/93.512; 384/538; 384/584; 384/585; 384/589
(58) Field of Classification Search
    USPC ..................................... 180/253; 280/93.512
    See application file for complete search history.

(56) References Cited

U.S. PATENT DOCUMENTS

| | | | |
|---|---|---|---|
| 1,759,640 A * | 5/1930 | Brunner et al. | 384/538 |
| 2,895,771 A * | 7/1959 | Ridgeway | 384/585 |
| 5,263,731 A | 11/1993 | Deutschel | |
| 5,489,156 A * | 2/1996 | Martinie | 384/538 |
| 5,685,650 A * | 11/1997 | Martinie et al. | 384/538 |
| 5,799,524 A | 9/1998 | Schäfer et al. | |
| 5,908,249 A * | 6/1999 | Nisley et al. | 384/484 |
| 6,006,568 A | 12/1999 | Bihrer | |
| 6,098,437 A | 8/2000 | Kocer et al. | |
| 6,131,932 A | 10/2000 | Bunker | |
| 6,394,472 B1 | 5/2002 | Graf et al. | |
| 6,513,818 B1 | 2/2003 | Seuser et al. | |
| 6,880,841 B2 | 4/2005 | Wang et al. | |
| 6,939,053 B2 * | 9/2005 | Nisley et al. | 384/538 |
| 7,490,840 B2 | 2/2009 | Luttinen et al. | |
| 7,604,415 B2 * | 10/2009 | Casey et al. | 384/538 |
| 7,651,105 B2 | 1/2010 | Webster et al. | |
| 8,137,000 B2 * | 3/2012 | Stephan et al. | 384/589 |
| 2003/0234504 A1 | 12/2003 | Frantzen | |
| 2004/0026885 A1 | 2/2004 | Lin | |
| 2006/0093251 A1 * | 5/2006 | Casey et al. | 384/538 |
| 2009/0180726 A1 | 7/2009 | Siebeneick et al. | |
| 2009/0261550 A1 | 10/2009 | Siebeneick | |
| 2011/0135233 A1 | 6/2011 | Sutherlin et al. | |

* cited by examiner

*Primary Examiner* — J. Allen Shriver, II
*Assistant Examiner* — Conan Duda
(74) *Attorney, Agent, or Firm* — Ingrassia Fisher & Lorenz, P.C.

(57) ABSTRACT

In accordance with exemplary embodiments, a wheel assembly is provided for a vehicle. The wheel assembly includes a knuckle having a tapered inner surface to interface with an outer flange of a bearing. A threaded fastener retains the bearing within the knuckle. A wheel hub couples to an inner flange of the bearing permitting rotation of the wheel hub relative to the knuckle.

20 Claims, 3 Drawing Sheets

VEHICLE WHEEL ASSEMBLY HAVING A SELF-RETAINING BEARING

TECHNICAL FIELD

The technical field generally relates to wheel mounting assemblies for vehicles, and more particularly to a knuckle for a wheel mounting assembly configured to receive a self-retaining bearing.

Contemporary motor vehicles have wheel assemblies for mounting wheels and tires to a vehicle. These wheel assemblies include one or more bearings facilitating rotation of the wheels. For wheel assemblies involved in steering the vehicle, the wheel assembly is provided with a pivoted steering knuckle that typically forms part of the wheel suspension. In this case, a wheel hub or mounting unit is coupled to the steering knuckle, which in turn, is mounted on the vehicle chassis. The wheel bearings are mounted to the knuckle and coupled to the wheel hub allowing the wheel hub (and thus the wheels) to rotate relative to the vehicle.

In conventional wheel assemblies, the wheel bearings are mounting to the knuckle via several fasteners (e.g., bolts). These fasteners add mass to the knuckle and increase drag, as well as increasing assembly and repair time due to each fastener having to be individually handled.

Accordingly, it is desirable to provide a wheel assembly for a vehicle that overcomes the detriments of prior, conventional wheel assemblies. Also, it is desirable to provide a vehicle wheel assembly with a self-retaining bearing that facilitates assembly and repair. Additionally, other desirable features and characteristics of the present disclosure will become apparent from the subsequent description taken in conjunction with the accompanying drawings and the foregoing technical field and background.

BRIEF SUMMARY

In accordance with first exemplary embodiments, a wheel assembly is provided for a vehicle. The wheel assembly includes a knuckle having a tapered inner surface coupled to a tapered sleeve. The tapered sleeve couples to an outer flange of a bearing that is retained by a threaded fastener coupled to a threaded end of the tapered sleeve. A wheel hub is coupled to an inner flange of the bearing permitting rotation of the wheel hub relative to the knuckle.

In accordance with second exemplary embodiments, a wheel assembly is provided for a vehicle. The wheel assembly includes a knuckle having a tapered inner surface to interface with an outer flange of a bearing. A threaded fastener couples to a threaded portion of the outer flange to retain the bearing. A wheel hub couples to an inner flange of the bearing permitting rotation of the wheel hub relative to the knuckle.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 2:
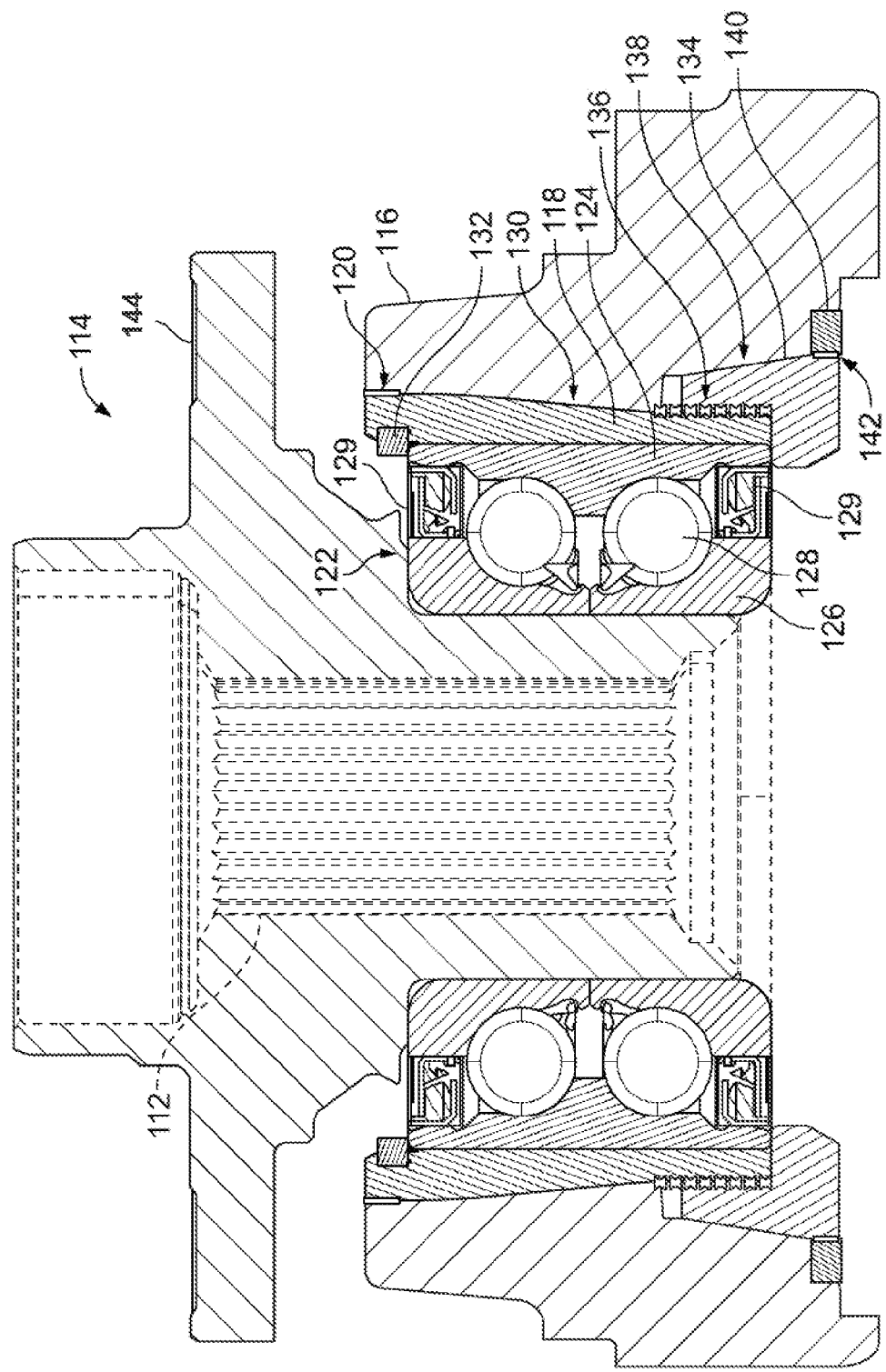
FIG. 2 is an illustration of one embodiment of a wheel assembly for suitable for use in the vehicle of FIG. 1.
Figure 3:
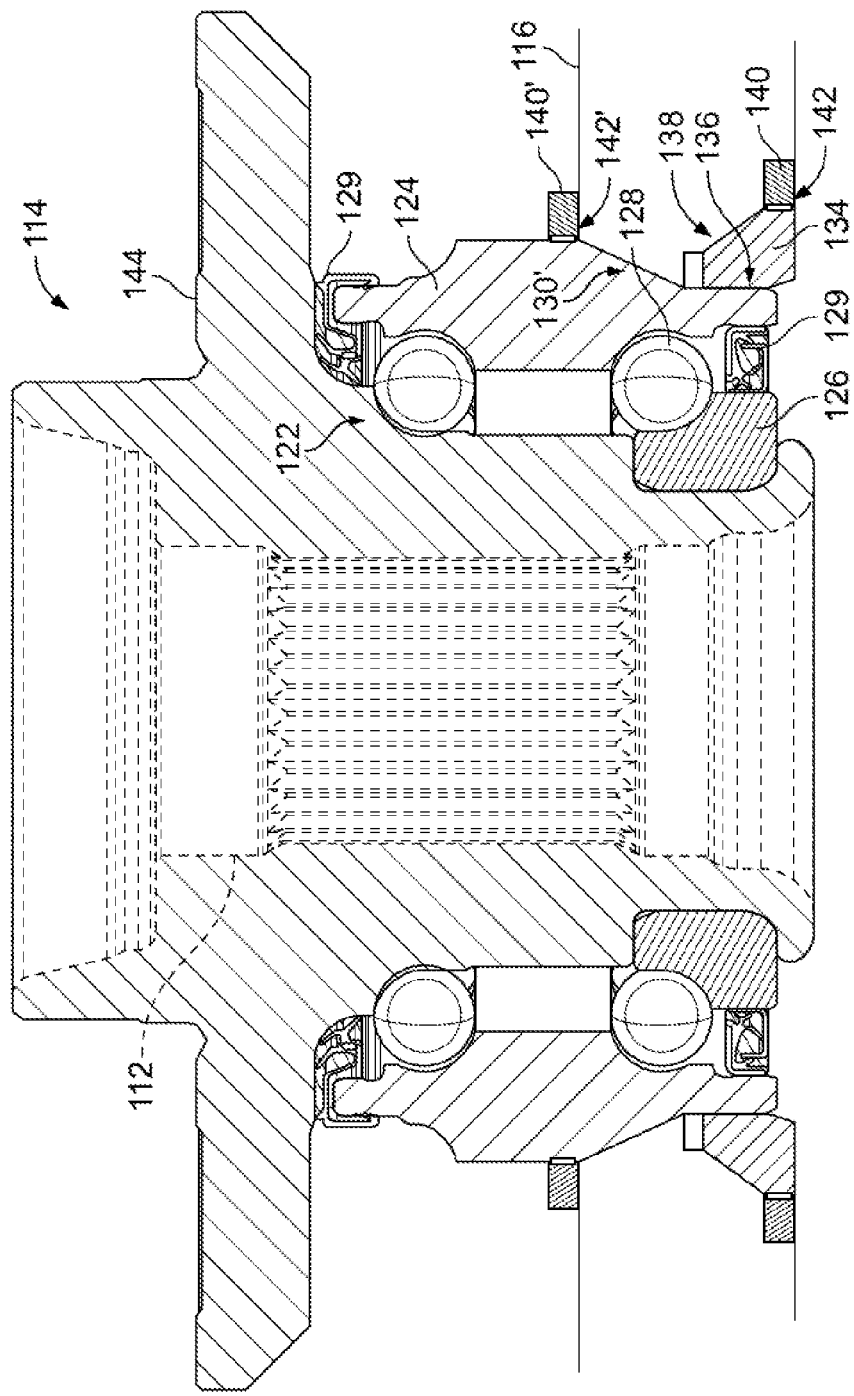
FIG. 3 an illustration of another embodiment of a wheel assembly for suitable for use in the vehicle of FIG. 1.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-3 are merely illustrative and may not be drawn to scale.

Figure 1:
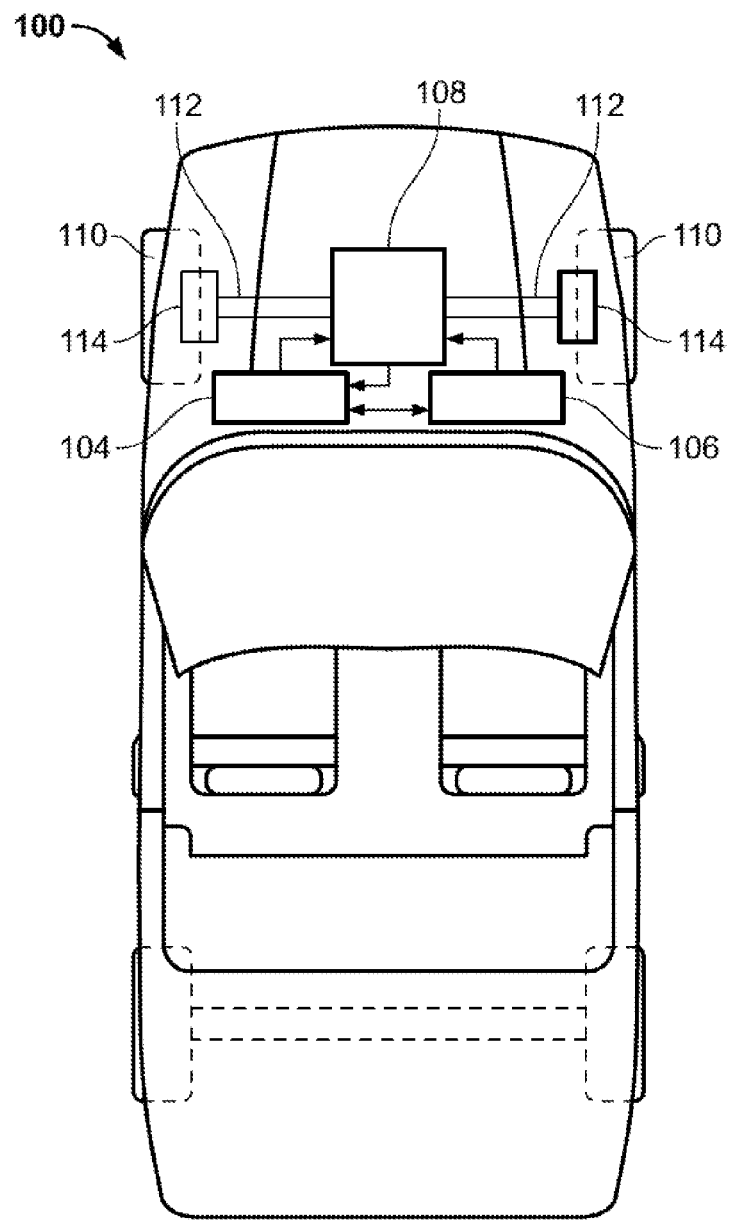
FIG. 1 is an illustration of a vehicle suitable for using exemplary embodiments of the present disclosure.

Referring to the drawings, wherein like reference numbers refer to like components, FIG. 1 is a simplified schematic representation of an embodiment of a vehicle 100 suitable for use with exemplary embodiments of the present disclosure. Although the vehicle 100 is illustrated as a purely electric vehicle, the techniques and concepts described herein are also applicable to hybrid electric vehicles or vehicles having internal combustion engines. The vehicle 100 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). In various embodiments, the vehicle 100 may incorporate any one of, or combination of, a number of different types of engines, such as, for example, an electric motor, a gasoline or diesel fueled combustion engine, a flex fuel vehicle (FFV) engine (i.e., using a mixture of gasoline and alcohol) or a gaseous compound (e.g., hydrogen and/or natural gas) fueled engine.

The illustrated embodiment of the electric vehicle 100 includes, without limitation an energy storage system 104, a control module 106 and a powertrain 108.

The energy storage system 104 may be realized as a rechargeable battery pack having a single battery module or any number of individual battery cells operatively interconnected (e.g., in series or in parallel), to supply electrical energy. A variety of battery chemistries may be employed within the energy storage system 104 such as, lead-acid, lithium-ion, nickel-cadmium, nickel-metal hydride, etc. In an electric vehicle embodiment, the energy storage system 104 may include a generator for charging the energy storage system. In a hybrid-electric vehicle embodiment, the internal combustion engine component of the drivetrain 108 may be used for charging the energy storage system. Also, in an internal combustion engine embodiment, an alternator may be used to change the energy storage system, which in this embodiment, comprises the vehicle batter to operate the starter and other electrical systems of the vehicle 100.

The control module 106, may include any type of processing element or vehicle controller, and may be equipped with nonvolatile memory, random access memory (RAM), discrete and analog input/output (I/O), a central processing unit, and/or communications interfaces for networking within a vehicular communications network. The control module 106 is coupled to the energy storage system 104 and the powertrain 108 and controls the flow of electrical energy between these modules depending on a required power command, the state of charge of the energy storage system 104, etc.

The powertrain 108 includes an electric motor and a transmission for driving front wheels 110 via drive shafts 112 to propel the vehicle 100. The front wheels 110 are coupled to the vehicle 100 in a rotary manner via wheel assemblies 114. The wheel assemblies 114 allow the wheels 110 to pivot with respect to the vehicle to enable the user to steer the vehicle during operation. According to various embodiment of the present disclosure, the wheel assemblies 114 afford an efficient and effective mechanism for assembly (and repair) as compared to conventional wheel assemblies.

FIG. 2 is an illustration of one embodiment of a wheel assembly 114 for suitable for use in the vehicle 100. The wheel assembly 114 includes a knuckle 116 that receives a taper sleeve 118. In some embodiments, the knuckle 116 and the tapered sleeve 180 couple at contoured interface 120. The contoured interface 120 may be realized as having a sinusoidal shaped circumference to prevent rotation between the knuckle 116 and the tapered sleeve 118. In other embodiments, various contoured shapes may be used to impede rotation between the knuckle 116 and the tapered sleeve 118. The tapered sleeve receives a bearing 122 that includes an outer flange 124, an inner flange 126 and a plurality of roller bearings 128. Additionally, the bearing 122 may include seals 129 to inhibit water and dust intrusion. It will be appreciated that the illustrated bearing of FIG. 2 is commonly referred to as a first generation (Gen 1) bearing configuration.

To develop clamp loading for the bearing 122, the knuckle 116 and the tapered sleeve 118 couple along a tapered interface 130. In some embodiments, the bearing 122 is retained within the tapered sleeve 118, and thus the knuckle 116, via a retaining ring 132. In other embodiments, the retaining ring 132 could be integrally formed with the tapered sleeve 118. The opposite end of the tapered sleeve is threaded to receive a threaded fastener 134 along a threaded interface 136. The threaded fastener 134 couples to the knuckle 116 along a tapered interface 138, which also develops clamp load for the bearing 122. According to various embodiments, the threaded fastener 134 replaces the plurality of individual fasteners required by conventional wheel assemblies, thus reducing mass and drag for the vehicle (100 in FIG. 1). To impede rotation under load, some embodiments include a contoured retainer 140 that provides a contoured interface 142 between the threaded fastener 134 and the knuckle 116.

Operationally, the wheel assembly includes a wheel hub 144 that couples to the inner flange 126 of the bearing 122. This allows the wheel hub (and thus a wheel for the vehicle) to rotate with respect to the knuckle 116 which is fixed, but pivotably mounted to the vehicle chassis and suspension system (not shown in FIG. 2). For driven wheels, the wheel hub 144 may optionally receive a drive shaft 112, which will propel the vehicle 100 via the powertrain 108 (see FIG. 1).

FIG. 3 an illustration of another embodiment of a wheel assembly 114 for suitable for use in the vehicle 100 where like reference numbers indicated like elements to FIG. 2. As can be seen, the bearing 122 of this embodiment is configured as a third generation (Gen 3) bearing. In other embodiments, a second generation (Gen 2) bearing could be employed in the wheel assembly 114. In the illustrated embodiment, a portion of the inner bearing flange 126 is realized as a portion of the wheel hub 144. This further reduces mass in the wheel assembly. The tapered sleeve (118 in FIG. 2) is not required in this embodiment and the clamping load for the bearing 122 is provided by the tapered interface 130' between the outer bearing flange 124 and the knuckle 116. A contoured retainer 140' provides a contoured interface 142' to prevent rotation of the outer bearing flange 124 with respect to the knuckle 116.

As discussed above with the embodiment of FIG. 2, the wheel hub 144 interfaces with the inner bearing flange 126 (and in this embodiment, directly with some of the roller bearings 128) to be rotably coupled to the knuckle 116. Optionally, for a driven bearing configuration, a drive shaft 112 may be couple to the wheel hub 144 to propel the vehicle 100 via the powertrain 108 (see FIG. 1).

Accordingly, a wheel assembly is provided for a vehicle. The various embodiment of the disclosed wheel assembly employ a threaded fastener to retain the bearing within the knuckle. This configuration eliminates the multiple fasteners required by conventional wheel assemblies, which reduces mass and drag for the vehicle. Also, assembly and repair are facilitated by the more efficient fastening mechanism provided by the present disclosure, which provides an expedient and effective bearing coupling interface between the wheel hub and the knuckle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wheel assembly, comprising: a knuckle having a tapered inner surface; a bearing having an inner flange and an outer flange; a tapered sleeve coupled to the tapered inner surface of the knuckle and to the outer flange of the bearing; a threaded fastener coupled to a threaded end of the tapered sleeve for retaining the bearing within the tapered sleeve; and a wheel hub coupled to the inner flange of the bearing; wherein, the bearing couples the wheel hub to the knuckle while permitting rotation of the wheel hub relative to the knuckle.

2. The wheel assembly of claim 1, wherein a portion of the tapered sleeve provides a contoured interface with the knuckle to resist rotation of the tapered sleeve relative to the knuckle.

3. The wheel assembly of claim 1, wherein the tapered sleeve includes a bearing retaining member at an end of the tapered sleeve opposite the threaded end of the tapered sleeve.

4. The wheel assembly of claim 1, which includes a contoured retaining ring configured at an end of the tapered sleeve opposite the threaded end of the tapered sleeve to resist rotation of the tapered sleeve relative to the knuckle.

5. The wheel assembly of claim 4, which includes a second contoured retaining ring for retaining the threaded fastener to the knuckle and to resist rotation of the threaded fastener relative to the knuckle.

6. The wheel assembly of claim 1, which includes a contoured retaining ring for retaining the threaded fastener to the knuckle and to resist rotation of the threaded fastener relative to the knuckle.

7. The wheel assembly of claim 1, wherein a portion of the tapered sleeve provides a tapered interface with the knuckle thereby providing a clamp load on the bearing.

8. The wheel assembly of claim 1, which includes a drive shaft coupled to the wheel hub.

9. A vehicle incorporating the wheel assembly of claim 8, further comprising a drivetrain coupled to the drive shaft providing power to rotate the wheel hub relative to the knuckle to propel the vehicle.

10. A wheel assembly, comprising: a bearing having an inner flange and an outer flange; the outer flange having a threaded portion; a knuckle having a tapered inner surface to interface with the outer flange; a threaded fastener coupled to the threaded portion to retain the bearing between the threaded fastener and a retaining ring; and a wheel hub coupled to the inner flange; wherein, the bearing couples the wheel hub to the knuckle while permitting rotation of the wheel hub relative to the knuckle.

11. The wheel assembly of claim 10, wherein the tapered inner surface of the knuckle interfaces with a mating tapered surface of the outer flange of the bearing to provide a clamp load for the bearing.

12. The wheel assembly of claim 11, wherein the threaded fastener includes tapered surface that interfaces with a mating tapered surface of the knuckle to provide a clamp load for the bearing.

13. The wheel assembly of claim 10, wherein the retaining ring is contoured and interfaces with the outer flange of the bearing to resist rotation of the outer flange relative to the knuckle.

14. The wheel assembly of claim 13, which includes a second contoured retaining ring configured interface with the threaded fastener to resist rotation of the threaded fastener relative to the knuckle.

15. The wheel assembly of claim 10, which includes a second contoured retaining ring for retaining the threaded fastener to the knuckle and to resist rotation of the threaded fastener relative to the knuckle.

16. The wheel assembly of claim 10, which includes a drive shaft coupled to the wheel hub.

17. A vehicle incorporating the wheel assembly of claim 16, further comprising a drivetrain coupled to the drive shaft providing power to rotate the wheel hub relative to the knuckle to propel the vehicle.

18. A vehicle, comprising: a vehicle chassis; first and second drive shafts; a drivetrain coupled the vehicle chassis and to the first and second drive shafts; first and second wheel assemblies coupled to the first and second drive shafts, each of the first and second wheel assemblies comprising: a bearing having an inner flange and an outer flange; a knuckle coupled to the vehicle chassis and having a first tapered inner surface to couple to the outer flange and provide a clamp load to the bearing, the knuckle having a second tapered surface; a threaded fastener having a tapered surface to couple to the second tapered surface to retain the bearing within the knuckle and provide additional clamp load to the bearing; and a wheel hub coupled to the inner flange and a respective one of the first and second drive shafts; wherein, the bearing of each wheel assembly respectively couples the wheel hub of each wheel assembly and the knuckle of each wheel assembly thereby permitting rotation of each wheel hub relative to the respective knuckle facilitating the drivetrain to propel the vehicle.

19. The vehicle of claim 18, wherein the knuckle of each of the first and second wheel assemblies are pivotably coupled to the vehicle chassis to facilitate steering of the vehicle while being propelled by the drivetrain.

20. The vehicle of claim 18, wherein the first and second wheel assemblies include retaining rings to resist rotation of the outer flange of the bearing and threaded fastener relative to the knuckle.

* * * * *